June 23, 1970 R. A. DE ROSE ET AL 3,516,142

FLAT-PACK MANIPULATION TOOLS

Filed June 9, 1967 2 Sheets-Sheet 1

INVENTORS
R. A. DeROSE
A. J. MOTTL
R. A. MADDEN

BY [signature] ATTORNEY

June 23, 1970 R. A. DE ROSE ET AL 3,516,142

FLAT-PACK MANIPULATION TOOLS

Filed June 9, 1967 2 Sheets-Sheet 2

3,516,142

FLAT-PACK MANIPULATION TOOLS

Ralph A. DeRose, Villa Park, Anton J. Mottl, Berwyn, and Richard A. Madden, Hinsdale, Ill., assignors to International Telephone and Telegraph Corporation, New York, N.Y., a corporation of Maryland Filed June 9, 1967, Ser. No. 645,026
Int. Cl. H05k *13/04*
U.S. Cl. 29—203 3 Claims

ABSTRACT OF THE DISCLOSURE

A hand-tool has a handle on one end and a pair of arm-like devices on the other end with means for imparting a linear motion to a flat-pack as it is inserted into or removed from a socket. For insertion, the pair of arms are lined with comb-like tines which straighten and support contacts on the flat-pack. For removal, the pair of arms include a bifurcated extractor having bent tips which fit under the flat-pack while it is being lifted.

This invention relates generally to tools of a type used for manipulating flat-packs and more particularly to tools for inserting them into and removing them from sockets mounted on printed circuit boards.

Flat-packs are modules containing semi-conductor materials fashioned into an integrated or monolithic circuit. While these flat-packs may come in a variety of different physical arrangements, an exemplary unit might be a dual in-line flat-pack unit in the order of ¾" x ¼" x ⅛". A number of thin metallic ribbons project outwardly from each edge of the flat-pack in order to provide electrical conductors or terminal lugs for making connections between the semiconductor material inside the flat-pack and the external circuits on the printed circuit board. In the flat-pack having the particular dimensions described above, there might be fourteen such ribbon-like contacts.

A conventional way of mounting these flat-packs is to attach a socket on a printed circuit card and then push the thin ribbon-like contacts of the flat pack into spring contact clips embedded in holes in the sockets. To remove the flat-pack, it is necessary to pull it out of the socket in a direction which is exactly perpendicular to the face of the socket.

While this form of mounting may appear to be quite conventional, it is very tedious and frustrating to insert and remove the flat-pack. The fourteen small ribbon-like contacts are very weak, and they bend easily. They are difficult to align with the holes in the socket so that if at least one of the contacts miss the socket opening it is impossible to mount the flat-pack, and the contacts bend when there is an attempt to push the flat-pack into its socket. Similarly, the contacts bend when the flat-pack is pulled from its socket unless the pull is completely linear with no twisting or bending.

Accordingly, an object of the invention is to provide tools for manipulating flat-packs while they are being mounted on or removed from flat-pack sockets. In this connection, an object is to provide means for shaping and supporting the contacts on flat-packs while they are being inserted in said socket.

In keeping with an aspect of the invention, these and other objects are accomplished by separate insertion and removal tools. The insertion tool includes a nesting support and a movable anvil. The support includes a comb-like structure which receives the flat-pack when it is pushed into a nested position. In the process, the comb straightens the contacts and supports them with precision in their mounting position. The anvil is then moved to push the flat-pack out of its nested position so that the tips of the contacts enter the socket. The removal tool includes a yoke support embracing a bifurcated lift member having tips which are bent to fit under the flat-pack. While the yoke stands on the socket, the bifurcated lift member is pulled up toward the top of the yoke. This pull forces the flat-pack out of the socket, with movement being in a linear direction which is directly perpendicular to the socket with no twisting or bending.

The above mentioned and other objects and features of this invention and the manner of obtaining them will become more apparent, and the invention itself will be best understood by reference to the following description of an embodiment of the invention taken in conjunction with the accompanying drawings, in which.

The various figures show a flat-pack 40 and its socket 41, both of which are entirely conventional. The flat-pack includes a number of thin, metallic, oppositely disposed, ribbon-like contact elements (two of which are numbered 42, 43) projecting outwardly from either side.

The socket 41 is usually designed to be mounted on a printed circuit board 44. There are a number of holes in the socket, each of which has a spring clip embedded therein to individually receive the tip of a similarly positioned contact on the flat-pack. The spring clip clamps the flat-pack contacts with a pressure adequate to insure a good electrical connection. The problem is to simultaneously push all of the contact tips into or pull them from these socket holes against the pressure of the spring clips and without bending them.

Figure 1:
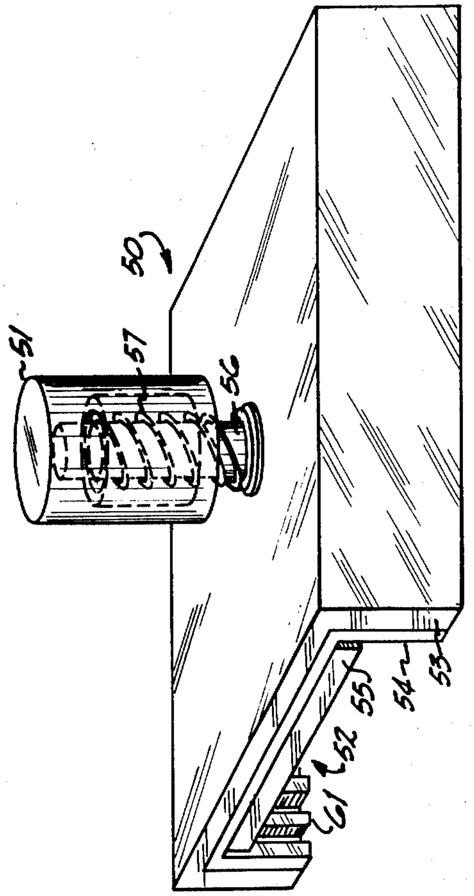
FIG. 1 is a perspective view of an insertion tool embodying the principles of the invention.
Figure 6:
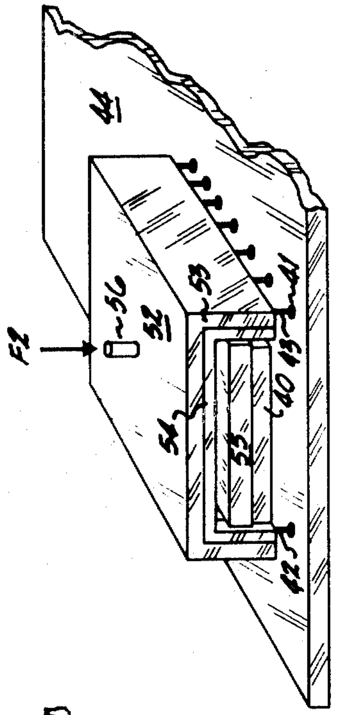
FIG. 6 is a perspective view showing an insertion tool pushing a flat-pack into a socket mounted on a printed circuit card.
Figure 7:
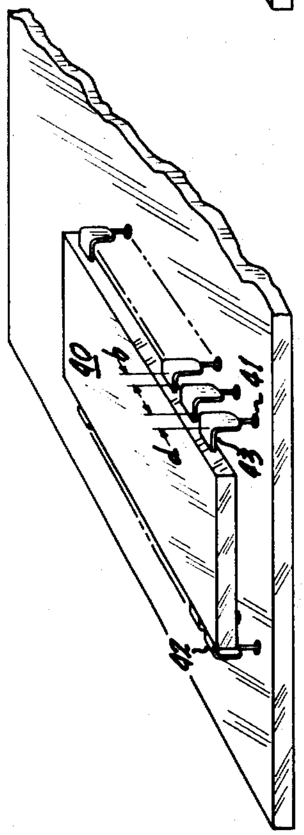
FIG. 7 is a perspective view of the flat-pack after it has been mounted on the printed circuit board.

As shown in FIG. 1, the insertion tool includes a frame 50 having a spring loaded handle 51 on one end and a support member 52 on the other end. The support has two arm-like members for receiving the flat-pack.

The support member 52 includes an outer shell 53, an inner comb-like member 54, and a movable anvil 55 for imparting a linear motion to said flat-pack. The anvil 55 is attached, in any suitable manner, to the lower end of a shaft 56. The handle 51 is attached to the opposite end of the shaft. Normally, the shaft 56 (and the anvil) is held in a raised position (as viewed in FIG. 1) under the bias force of a coiled spring 57.

Figure 2:
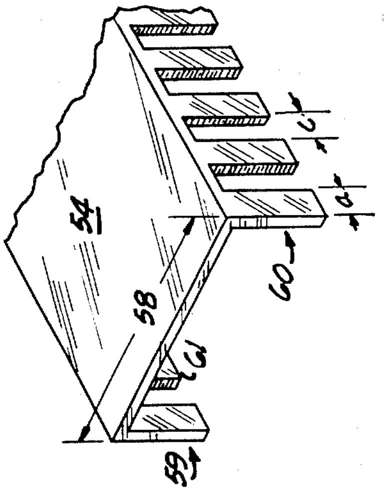
FIG. 2 is a perspective view of a fragment of a comb-like structure used to straighten and support the contacts on the flat-pack.

The details of the comb-like structure 54 should be most apparent from an inspection of FIG. 2. Basically, it is a piece part which has been stamped from sheet metal and then bent to have a generally U-shaped cross-section. The bottom 58 of the U has a width such that the comb-like member fits snugly inside the outer shell 53, thereby forming a single unitary structure for nestingly receiving a flat-pack 40. The opposite sides 59, 60 of the U have a number of tines (one of which is numbered 61). Each tine has a width *a* which is slightly smaller than the space *b* between adjacent contacts on a flat-pack. The space *c* between adjacent tines on the comb-like structure 54 is slightly wider than the width *d* of a contact on the flat-pack. Thus, the contacts fit between the tines when the flat-pack is in its nested position.

Figure 5:
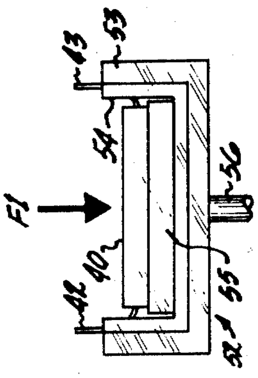
FIGS. 3–5 are three stop motion views showing how a flat-pack is pushed into a nesting position in the insertion tool.
Figure 4:
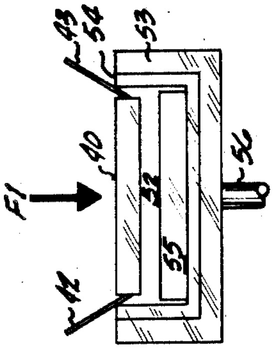
Figure 3:
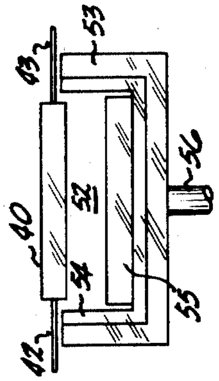

The method of operating the insertion tool should become apparent from a study of FIGS. 3–5. First (FIG. 3), the tool is inverted, and the flat-pack 40 is placed on top of the support member 52. The contacts 42, 43 on the flat-pack 40 are positioned in alignment over the space between the tines of the comb-like structure 54. Then (FIG. 4), a force F1 is exerted upon the flat-pack 40 to push it into a nested position within the support 52. As the flat-pack moves downwardly, the contacts 42, 43 bend to conform to the shape of sides 59, 60 of the U-shape of the support 53. While the force F1 continues to be applied (FIG. 5), the tines of the comb-like structure 54 comb the contacts 42, 43 and straighten them.

When the flat-pack 40 reaches the bottom of the U-shaped channel 58–60 in the insertion tool, the tips of the contacts 42, 43 should be straight and accurately positioned to correspond to the holes in socket 41. If not, the contact tips may be further straightened in any convenient manner. For example, a known straightening tool is a piece of steel (not shown) having a number of accurately drilled, countersunk holes positioned to correspond to the desired positions of the contact tips 42, 43. When the holes in this piece of steel are placed in juxtaposition to the tips and then pushed downwardly over the tips, they are straightened.

After the user is satisfied that the contacts are straight and accurately positioned, he returns the insertion tool to its upright position (as shown in FIG. 1) and holds the contact tips over the holes in the socket 41. Then, he pushes downwardly upon the handle 51 with a force F2. As the handle moves against the bias of the spring 57, the shaft 56 slides through a hole in frame 50. This moves the anvil 55 downwardly to push the flat-pack 40 out of its nested position in the support 52.

While the flat-pack 40 is so moving, the contacts 42, 43 are guided and supported by the tines of the comb-like structure 54. This support provides the mechanical strength which prevents the contact tips from bending, while they are being pushed into the socket against the spring pressure of the contact clips inside the socket.

When the handle 51 is released, it moves upwardly under the bias of the spring 57. The insertion tool may then be lifted away without disturbing the flat-pack 40 which is held under the grip of the springs in the socket 41.

The removal tool 70 includes a yoke 71 for slidingly supporting a bifurcated extractor or lift element 72 which provides arm-like means for receiving a flat-pack. The yoke and extractor elements 71, 72 preferably have guideways 73, 74 which facilitate the sliding movement while preventing any twisting. The lower tips 75, 76 of the extractor lift arms are bent inwardly to slip under the flat-pack 40 and engage it near the ends thereof. The upper or closed end of the bifurcated extractor 72 is attached via a shaft 77 to a member 78 for exerting a lifting force.

Figure 9:
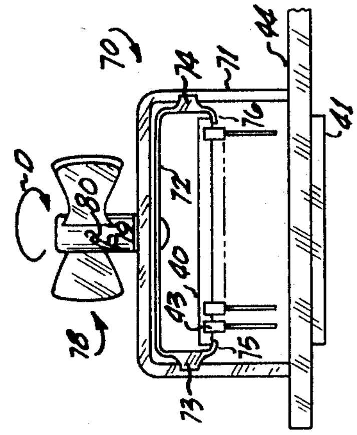
FIG. 9 is a similar view of the removal tool of FIG. 8 after it has been operated to pull the flat-pack from its socket.
Figure 8:
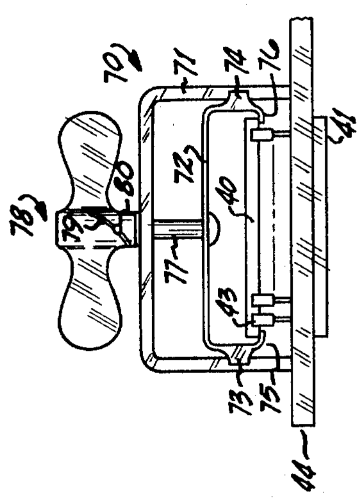
FIG. 8 is a side view of an unoperated removal tool positioned to pull a flat-pack from its socket.

In the embodiment of FIGS. 8 and 9, the lift member 78 is a turn-handle having a helical slot 79 therein. The bifurcated extractor shaft 77 has a pin 80 which rides in the helical slot to raise and lower the extractor 72 as the handle 78 is rotated. For example, FIG. 9 shows that the handle 78 has been rotated in a direction D so that the pin 80 has been carried upwardly in the slot 79. Since the pin 80 moves upwardly, the shaft 77 and extractor 72 also move up. As the extractor tips 75, 76 raise, the flat-pack 40 also raises to pull the contacts 42, 43 out of the socket 41.

While the bifurcated extractor 72 raises, the feet of the yoke 71 stand on the tip of the socket 41 or printed circuit board 44. This immobilizes the yoke, prevents any twisting motion, and insures an extraction straight upwardly, with a linear motion. Thus, it is seen that the bifurcated member provides means for imparting a linear motion to the flat-pack.

Figure 10:
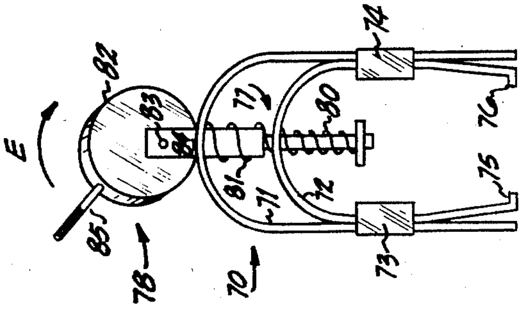
FIG. 10 is an alternative embodiment of the removal tool, here shown in the unoperated position.

In the embodiment of FIG. 10, the removal tool is similar to that of FIGS. 8 and 9. In each embodiment, yoke 71 and bifurcated extractor 72 are constructed and operated in essentially the same manner.

The primary difference between the embodiments of FIGS. 8, 9 and 10 lies in the structure used to apply the lifting force to the extractor. That is, FIG. 10 included a spring 80 having enough tension to provide the lift force required to pull the flat-pack from its socket. Another spring 81 is provided to maintain a tight assembly. A wheel 82 is eccentrically mounted on an axle at 83 on the upper end of a shaft 84 connected to the bifurcated extractor 72. A bat handle 85 is attached to the rim of wheel 82. Thus, if the bat handle swings in the direction E, the wheel 82 turns on the axle 83 and acts as a cam to lift the extractor. Most of the lifting force comes from the tension in the spring 86. This helps prevent twisting responsive to clumsy human ineptness.

While the principles of this invention have been described above in connection with specific apparatus and applications it is to be understood that this description is made only by way of example and not as a limitation in the scope of the invention.

We claim:

1. A tool for manipulating flat-packs comprising a support structure for nestingly receiving a flat-pack, a comb-like means for straightening and supporting the contacts on said flat-pack, said comb-like means comprising a plurality of tines; and movable anvil means in said support structure for pushing said flat-pack out of its nesting support and into a socket, the tines of said comb-like means guiding and supporting the contacts on the flat-pack.

2. The tool of claim 1 wherein said comb-like structure has a generally U-shaped channel, the tines of said comb-like structure lining the open sides of said U-shaped channel, said movable anvil lying in the closed end of said U-shaped channel.

3. The tool of claim 1 and spring bias means for exerting a normal position bias force upon said anvil.

References Cited

UNITED STATES PATENTS

| | | | |
|---|---|---|---|
| 2,869,129 | 1/1959 | Rogers | 140—71 X |
| 3,004,262 | 10/1961 | Cubbidge et al. | |
| 3,117,370 | 1/1964 | Kauppi et al. | 29—206 |
| 3,253,327 | 5/1966 | McElligatt | 29—206 |
| 3,267,716 | 8/1966 | Hales | 72—384 |
| 3,317,989 | 5/1967 | Cull. | |
| 3,377,689 | 4/1968 | Kimmett. | |

THOMAS H. EAGER, Primary Examiner

U.S. Cl. X.R.

29—206